Jan. 26, 1960         C. W. ATTWOOD         2,922,607
PALLETS OF THE LOAD SUPPORTING TYPE
Filed Oct. 14, 1957                        2 Sheets-Sheet 1

INVENTOR.
CHARLES W. ATTWOOD

BY Hauke & Hardesty

ATTORNEYS

Jan. 26, 1960   C. W. ATTWOOD   2,922,607
PALLETS OF THE LOAD SUPPORTING TYPE
Filed Oct. 14, 1957   2 Sheets-Sheet 2

*INVENTOR.*
CHARLES W. ATTWOOD
ATTORNEYS

United States Patent Office 2,922,607
Patented Jan. 26, 1960

2,922,607

PALLETS OF THE LOAD SUPPORTING TYPE

Charles W. Attwood, Wayne, Mich.

Application October 14, 1957, Serial No. 690,110

5 Claims. (Cl. 248—120)

The present invention relates to pallets such as are commonly used for storage and transport of goods, and has among its objects the provision of a pallet which may be provided with either legs or casters.

Another object is the provision of a pallet structure which has a greater weight supporting strength per unit weight of the materials of which it is constructed.

Another object is, of course, the converse of the preceding object and the provision of a pallet capable of supporting a given weight but made of lighter weight of materials.

Another object is the provision of a pallet deck which is stronger and simpler to construct than those heretofore produced.

Other objects will readily occur to those skilled in the art upon reference to the following description and the accompanying drawings in which Fig. 1 is a plan view of a pallet deck constructed according to the present invention.

Figure 1:
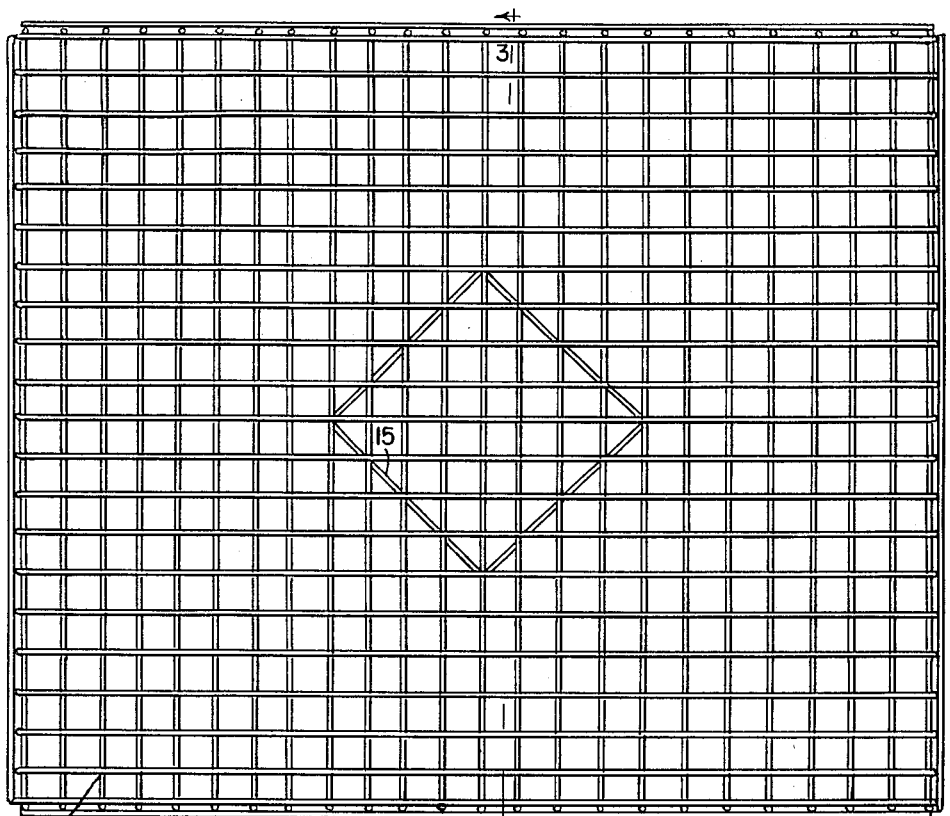

In the drawings the pallet is indicated as being made by securing side and end walls to the deck which may be provided with legs or, as stated above, casters (not shown).

Figure 2:
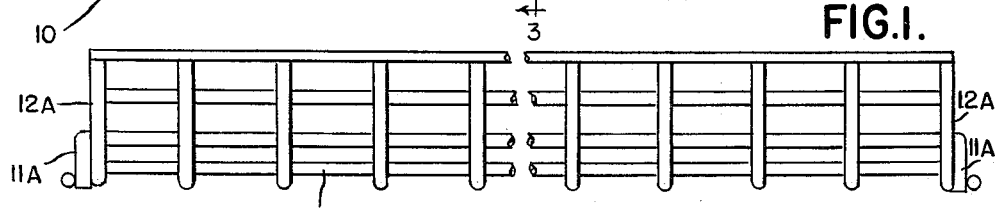
Fig. 2 is a side elevation of the same as from the bottom of Fig. 1.
Figure 3:
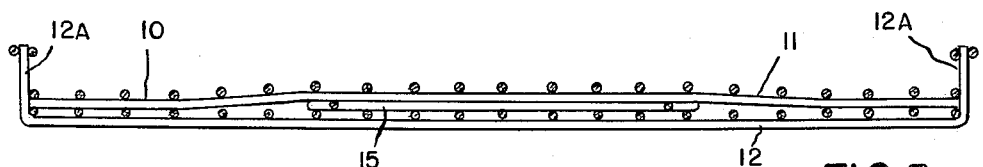
Fig. 3 is a sectional view on line 3—3 of Fig. 1.

Referring first to Figs. 1 to 3, the deck, indicated as a whole by the numeral 10, is shown as consisting of two sheets or plies 11 and 12 of mesh material consisting of heavy wires or rods crossing at right angles and welded together at the crossing points. Such material is a well known product and while round wires or rods are preferred, the invention is equally applicable to flattened wires or flat bars.

The two sheets are of such area that one of them, for example the bottom sheet, extends a short distance beyond the other at the ends of the deck and has the extending ends bent up at right angles over the edges of sheet 11 as shown at 12A. The other sheet 11 is sufficiently wide to extend a short distance beyond the side edges of sheet 12 and has these extensions bent downwardly at right angles over the edges of sheet 12 as shown at 11A.

The two sheets are welded to each other along the sides and ends, but before doing such welding, a spacing member 15 is placed between the sheets at their central areas. The spacing member 15 is preferably a polygonal loop of rod about the same gauge as the rods or wires of the sheets 11 and 12 or somewhat larger, and while a rectangular loop is shown, other shapes may be used if desired, the function being to maintain a separation of the two sheets 11 and 12. Spacer 15 may be spot welded to either or both sheets 11 and 12 so as to prevent dislocation.

To the deck so constructed may be welded or otherwise secured angle plates 21 carrying legs 20 or other supports such as casters.

Figure 4:
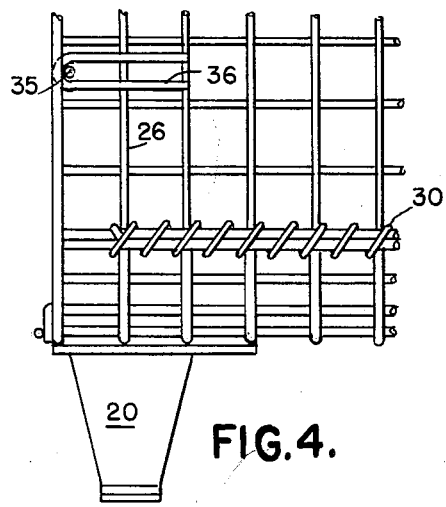
Figs. 4, 5 and 6 are partial views of a pallet utilizing the deck of Figs. 1 to 3.
Figure 5:
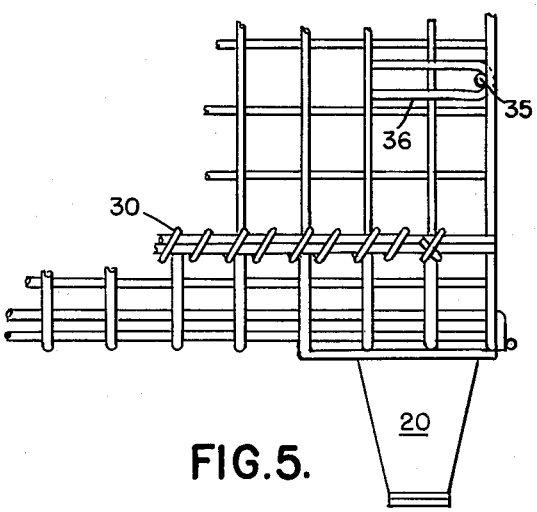
Figure 6:
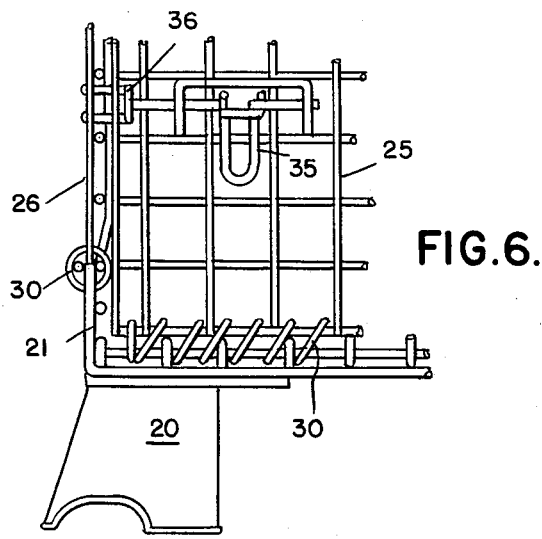

Also to the side and end edges of the deck 10, side and end walls 25 and 26, respectively, are secured preferably in hinged relation by means of the spiral hinging members 30. Means for holding such walls in erected condition is indicated in Figs. 4 to 6, such means being shown as a sliding bolt 35 on a wall cooperating with a loop 36 on an adjacent wall.

By spacing the two sheets of mesh materials at their central areas as shown and fixing them together at their edges, a sort of truss action is accomplished with the bending strength considerably above that of the two sheets not so spaced.

Also, turning over the edges of the sheets as described, reinforces these edges against bending.

I claim:

1. A pallet structure including a deck consisting of a plurality of sheets of superposed metallic mesh material having their edge portions contacting and welded together and having interposed means for spacing said sheets from each other at their intermediate portions.

2. A deck member for a pallet consisting of a plurality of sheets of metallic mesh material superposed and welded together at their edge portions and having a spacing element interposed between said sheets at their central portions, said element consisting of a polygonal loop of metal rod welded to at least one of said sheets.

3. A deck member for a pallet consisting of a pair of superposed metallic sheets of mesh material, the lower one of said sheets having two opposite edges turned up over the adjacent edges of the upper sheet and the upper sheet having its free edges turned down over the adjacent edges of the lower sheet, said sheets being welded together at their edges, and a metallic spaced arranged between said sheets between their central areas and welded to at least one of said sheets.

4. A pallet consisting of a deck composed of a plurality of sheets of superposed metallic mesh material having their edge portions contacting and welded together and having interposed means for spacing said sheets from each other at their intermediate portions, said deck having side and end walls hinged to its edges.

5. A pallet consisting of a deck member composed of a pair of superposed metallic sheets of mesh material, the lower one of said sheets having two opposite edges turned up over the adjacent edges of the upper sheet and the upper sheet having its free edges turned down over the adjacent edges of the lower sheet, said sheets being welded together at their edges, and a metallic spacer arranged between said sheets between their central areas and welded to at least one of said sheets, said deck member having side walls hinged to the upper sheet at its turned down edges and to the turned up edges of the lower sheet.

References Cited in the file of this patent

UNITED STATES PATENTS 2,447,556  Bitney ---------------- Aug. 24, 1948
2,622,830  Coit ------------------ Dec. 23, 1952